United States Patent
Schmitt

[19]

[11] Patent Number: 5,954,184
[45] Date of Patent: Sep. 21, 1999

[54] APPARATUS AND METHOD FOR FEEDING, PRESENTING AND/OR ORIENTING PARTS

[75] Inventor: Werner H. Schmitt, Falls Church, Va.

[73] Assignee: Hoppmann Corporation, Chantilly, Va.

[21] Appl. No.: 08/928,640

[22] Filed: Sep. 12, 1997

[51] Int. Cl.$^6$ .................................................. B65G 29/00
[52] U.S. Cl. ............................................................. 198/392
[58] Field of Search .................................. 198/392, 396, 198/397.06, 443

[56] References Cited

U.S. PATENT DOCUMENTS

| | | |
|---|---|---|
| 2,667,961 | 2/1954 | Reese et al. . |
| 2,941,651 | 6/1960 | Hutter et al. . |
| 3,049,215 | 8/1962 | Hutter et al. . |
| 3,065,841 | 11/1962 | Stover ...................................... 198/392 |
| 3,471,000 | 10/1969 | Bodolay et al. . |
| 3,684,077 | 8/1972 | MacIntyre ................................ 198/392 |
| 4,526,269 | 7/1985 | Henderson et al. . |
| 4,610,345 | 9/1986 | Spreen et al. ............................ 198/392 |
| 4,705,156 | 11/1987 | Boling . |
| 4,828,100 | 5/1989 | Hoppmann et al. ..................... 198/392 |
| 4,830,172 | 5/1989 | Hilton et al. . |
| 4,878,575 | 11/1989 | McDonald et al. . |
| 4,962,842 | 10/1990 | Limoni . |
| 5,044,487 | 9/1991 | Spatafora et al. . |
| 5,065,852 | 11/1991 | Marti ........................................ 198/392 |
| 5,178,256 | 1/1993 | Anderson et al. .................. 198/392 X |
| 5,372,236 | 12/1994 | Layer . |
| 5,474,493 | 12/1995 | Tolbert ................................ 198/392 X |
| 5,740,899 | 4/1998 | Pugh et al. . |

FOREIGN PATENT DOCUMENTS

| | | |
|---|---|---|
| 1558060 | 1/1969 | France . |
| 273619A1 | 11/1989 | German Dem. Rep. . |
| 1917175 | 10/1969 | Germany . |
| 62-16919 | 1/1987 | Japan . |
| 558827 | 5/1977 | U.S.S.R. . |
| 558827 | 9/1977 | U.S.S.R. . |

OTHER PUBLICATIONS

"Vibratory Bowls, Parts Loaders and Lined Parts Feeders . . . " Warren Industries, Circle 378.

*Primary Examiner*—James R. Bidwell
*Attorney, Agent, or Firm*—Birch, Stewart, Kolasch & Birch LLP

[57] ABSTRACT

A parts feeding, presenting and/or orienting apparatus is provided having a rotatable disc for receiving parts from a hopper. The parts can slide from the disc onto a curved section of a conveyor or onto a linear section of conveyor or other discharge device. The rotatable disc can be vertically reciprocated and can have a plurality of ridges in order to preorient the parts. A downstream qualifier can return misoriented parts to the hopper for recirculation of the parts. The apparatus can operate from a slow to a fast speed. A robotic device can be used downstream of the qualifier and a return path can be provided in order to recirculate all parts, if so desired.

60 Claims, 4 Drawing Sheets

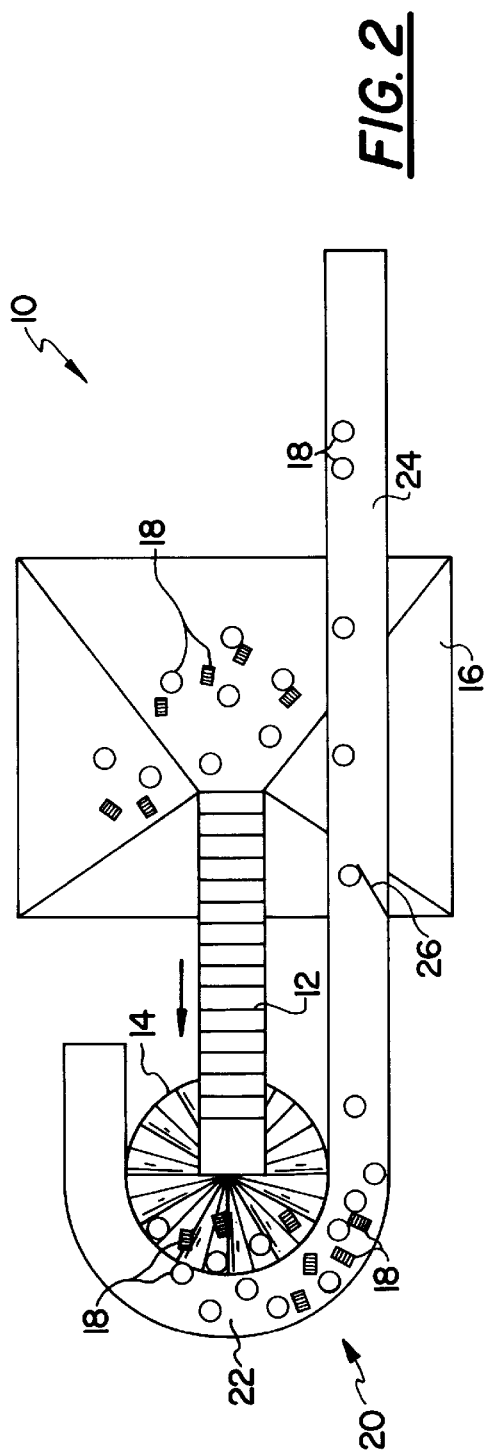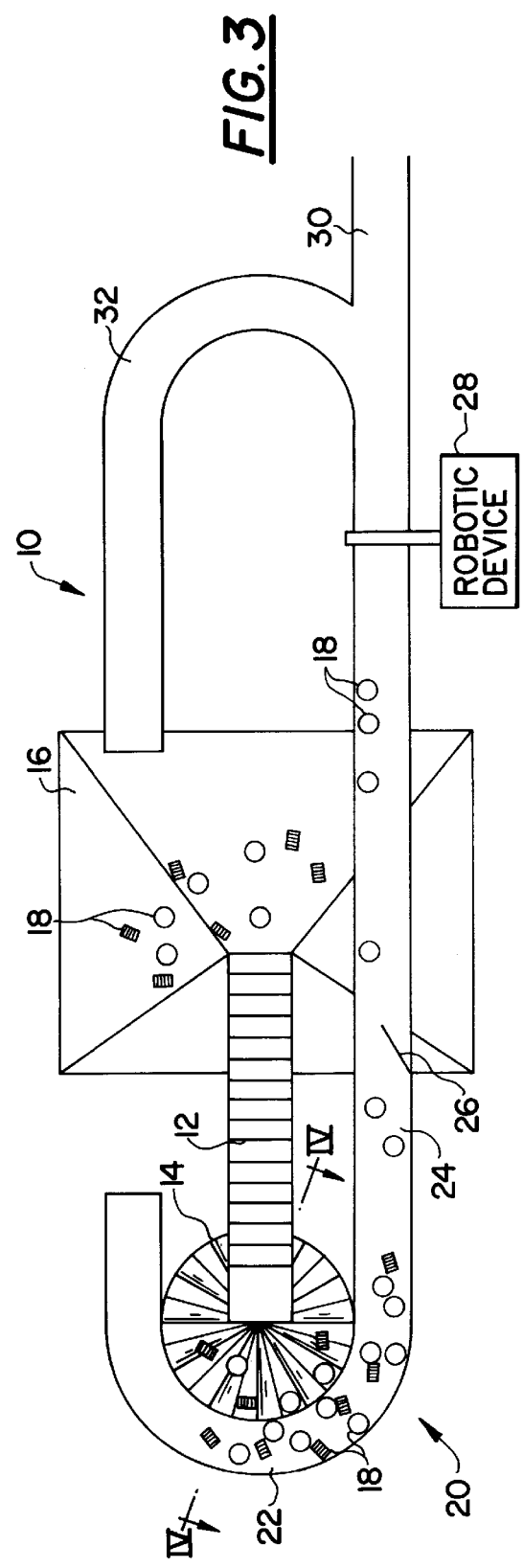

ized apparatus are known in the prior art. Some of these apparatus use
APPARATUS AND METHOD FOR FEEDING, PRESENTING AND/OR ORIENTING PARTS

BACKGROUND OF THE INVENTION

1. Field of the Invention

The present invention relates to a method and apparatus for feeding, presenting and/or orienting parts. In a first embodiment, parts are fed to a rotatable disc. A conveyor section surrounds at least a portion of this rotatable disc and receives parts therefrom. In a second embodiment, the conveyor simply passes adjacent or tangential the rotating disc. The conveyor can be used to recirculate the parts and a robotic device can be provided for removing oriented or non-oriented parts from the conveyor.

2. Description of the Background Art

Various parts feeding, presentation and/or orienting apparatus are known in the prior art. Some of these apparatus use centrifugal feeders for separating parts. When large parts are used, rather large feeders are necessary. This increases the overall size of the feeding device. Also, most centrifugal feeders work at high speeds and are, therefore, difficult to adapt to robotic systems which require a slower feed of articles.

Accordingly, a need exists for a simple and effective parts feeding, presenting and/or orienting apparatus. This apparatus should have minimal space requirements and should be able to handle various sized parts. In addition, this feeder should provide for presentation, orientation and/or singulation of the parts for subsequent handling. This apparatus should be adaptable for use with robotic devices and should, therefore, be capable of operating at slow speeds.

SUMMARY OF THE INVENTION

Accordingly, it is an object of the present invention to provide a parts feeding, presentation and/or orienting apparatus and method which enables feeding, presentation and/or orientation of parts with minimal space requirements.

It is an additional object of the present invention to provide a parts feeding, presentation and/or orientating apparatus and method which can feed parts at a slow speed.

It is a further object of the present invention to provide a parts feeding, presentation and/or orientating apparatus and method which can handle a variety of different sized parts.

It is yet another object of the present invention to provide a parts feeding, presentation and/or orientating apparatus and method which can recirculate the parts and is usable with a robotic device.

These and other objects of the present invention are fulfilled by providing a parts feeding, presentation and/or orientating apparatus comprising a rotatable disc, means for feeding parts to the disc, and a conveyor having a curved section and a downstream section, the curved section being upstream of the downstream section, the curved section of the conveyor surrounding at least a part of the disc, the curved section being adjacent the disc for receiving parts from the disc and the downstream section conveying parts away from the disc.

These and other objects of the present invention are also fulfilled by a method for feeding, presenting and/or orienting parts comprising the steps of feeding parts to a disc, rotating the disc to spread out the parts fed thereto, discharging the parts to a curved section surrounding at least a portion of the disc, and conveying the parts away from the curved conveyor section and the disc with a downstream conveyor section.

In addition, these and other objects of the present invention are fulfilled by a parts feeding, presentation and/or orienting apparatus comprising a rotatable disc having a conical section on an upper surface thereof, the disc being rotatable about a vertical axis, the upper surface of the disc forming a unitary surface which is rotatable at a same speed, means for feeding parts to the disc, a wall encircling at least a portion of the disc, the wall being only at a periphery of the disc whereby the upper surface of the disc is unobstructed, and discharge means for receiving parts from the disc, the discharge means being close to the disc such that parts move from the disc to the discharge means without tumbling.

Moreover, these and other objects of the invention are fulfilled by a parts feeding, presentation and/or orienting apparatus comprising a hopper for storing parts, means for feeding parts from the hopper, a conveyor for receiving parts from the means for feeding, the conveyor having a section which extends over the hopper, and a qualifier for wiping or otherwise returning misoriented parts from the conveyor, the qualifier being located at the section of the conveyor which extends over the hopper such that misoriented parts fall from the conveyor back to the hopper.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a plan view of the parts feeding, presentation and/or orienting apparatus having a first conveyor arrangement and a first embodiment of a rotatable disc;

FIG. 3 is a plan view of the parts feeding, presentation and/or orienting apparatus having a second conveyor arrangement;

DETAILED DESCRIPTION OF THE PREFERRED EMBODIMENTS

Figure 1:
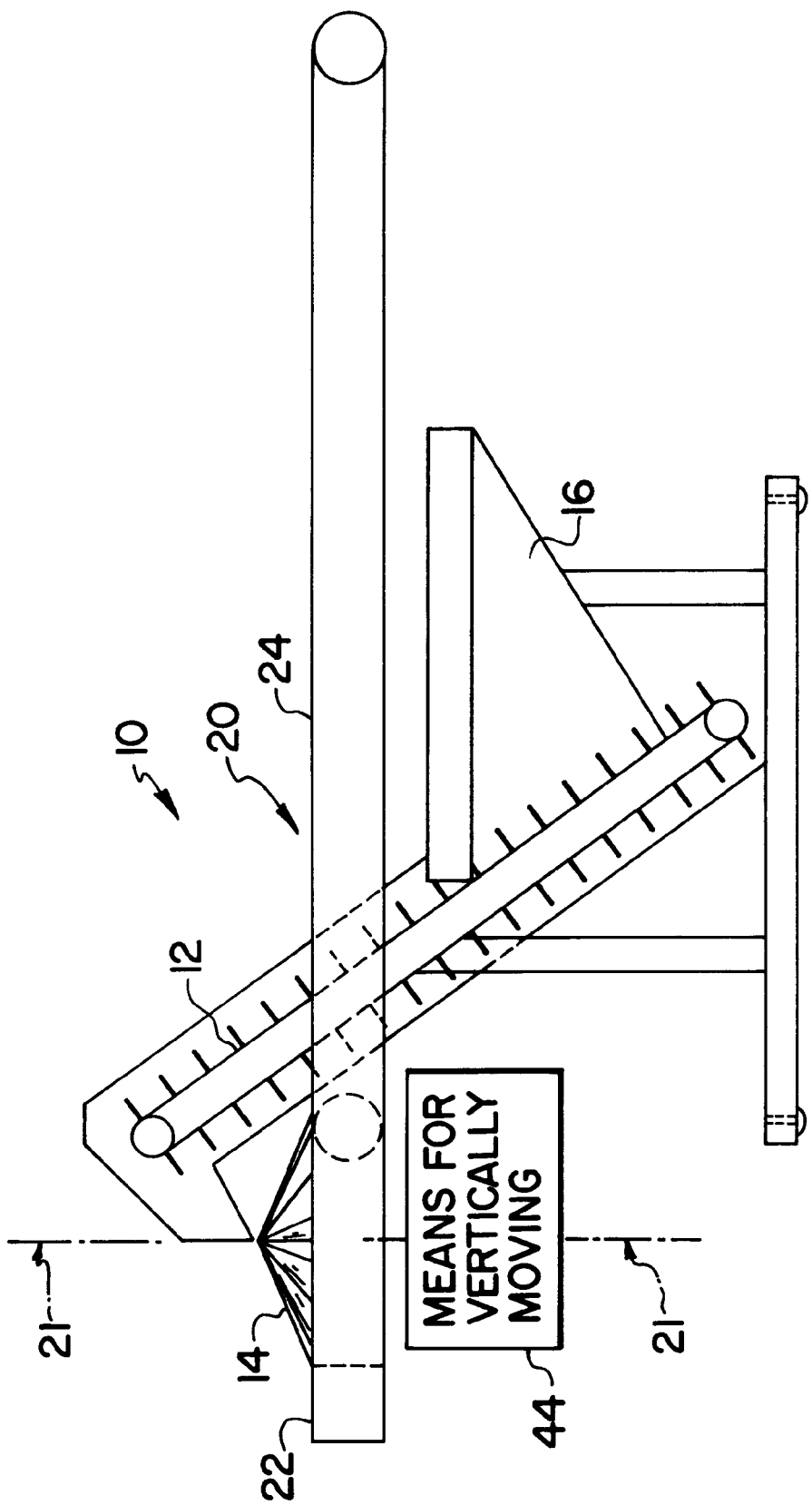
FIG. 1 is a side view of a parts feeding, presentation and/or orienting apparatus of the present invention.

Referring in detail to the drawings and with particular reference to FIG. 1, a parts feeding, presentation and/or orienting apparatus 10 is shown. This parts feeding, presentation and/or orienting apparatus 10 can feed, present and orient parts. One or any combination of these actions can be carried out by apparatus 10. The parts feeding, presentation and/or orienting apparatus 10 includes means 12 for feeding parts to a rotatable disc 14. This means 12 can be an endless conveyor as shown in FIG. 1 or any suitable device. The means 12 for feeding feeds parts from hopper 16 to the rotatable disc 14. As seen in FIG. 1, this hopper 16 is relatively deep. Therefore, the parts feeding, presentation and/or orienting apparatus 10 shown in FIG. 1 can handle relatively large parts. However, any suitably sized or shaped hopper 16 can be used. The parts feeding, presentation and/or orienting apparatus 10 of the present invention is adaptable to handle different sized parts as will be disclosed below.

Turning to FIGS. 2 and 3, a plurality of parts 18 are illustrated. The particularly shown parts 18 are not limitative of the type of parts which can be handled by the present invention. The hopper 16 in FIGS. 2 and 3 is not completely filled with parts 18 in the drawings. However, it should be understood that many more parts can be included in the hopper 16 than that shown in FIGS. 2 and 3. The few shown parts 18 in hopper 16 are merely for the sake of clarity. The downwardly sloped walls of hopper 16 will channel the parts to the means 12 for feeding. The parts will be lifted from the hopper 16 by the means 12 for feeding and dumped onto the upper surface of the rotatable disc 14.

The disc 14 is rotatable about a vertical axis 21, as indicated in FIG. 1. It is contemplated that this disc 14 will be horizontally oriented, rather than tilted, in order to better distribute the parts as will be disclosed below.

Discharge means 20 are provided for receiving the parts 18 from the rotatable disc 14. This discharge means 20 includes a curved section 22 and a downstream section 24 of a conveyor. In the figures, a continuous and unbroken one-piece conveyor is shown as the discharge means 20. This conveyor is continuous and unbroken between the curved section 22 and downstream section 24. This continuity helps to prevent misorientation of parts due to transfer of parts between conveyor sections. Also, the parts can be more easily handled. Of course, other types of conveyors are possible. Rather than a belt conveyor as indicated in the figures, roller conveyors, vibrating feeders, or any other means for receiving the parts from the rotatable disc 14 and subsequently conveying them downstream can be used.

The curved section 22 of the discharge means 20 surrounds at least a part of the disc 14. In FIGS. 2 and 3, the curved section 22 of the conveyor surrounds 180° of the disc 14 and is in contact therewith. The downstream section 24 extends from the curved section 22 along a generally linear path as seen in FIGS. 2 and 3. This downstream section 24 will pass over hopper 16. A qualifier 26 is provided for returning misoriented or unwanted parts to the hopper 16. The parts will fall from the downstream section 24 of the discharge means 20 back into the hopper 16. Rather than being positioned above the hopper, this downstream section 24 could instead feed to some chute which returns the parts 18 to the hopper 16. Also, rather than using a qualifier 26 which wipes parts 18 from the section 24, an air jet, movable arm or any other suitable arrangement can be used. Nevertheless, this arrangement would provide for recirculation of misoriented or unwanted parts 18.

The qualifier 26 aides in orienting parts. In order to prevent too many parts from being dropped onto the conveyor and jamming operation of the conveyor, the rotating disc 14 increases the total surface area of the discharge means 20 in the area of curved section 22 which can receive parts 18. In other words, the means 12 for feeding could dump parts directly onto the linear downstream section 24 of the discharge means 20. However, this might cause jamming of the parts. In order to spread out the parts, the rotatable disc 14 is used. The means 12 for feeding will dump parts onto the upper surface of the rotatable disc 14. By centrifugal action, these parts will spread out along the curved section 22 of the discharged means 20. Of course, the rotatable disc 14 and curved section 22 could be omitted and means 12 could dump parts directly onto a conveyor as will be described below. Nonetheless, the disc 14 and curved section 22 have the benefit of increasing the overall area available for receiving and spreading out parts.

The curved section 22 will move in a counterclockwise direction, as seen in FIGS. 2 and 3, as the conveyor of the discharge means 20 is operated. This rotation will move parts towards the downstream section 24 where they will pass the qualifier 26.

It should be noted that the rotatable disc 14 does not necessarily singulate article as they move onto the discharge means 20. Side-by-side articles can be singulated and properly oriented on the downstream conveyor section 24. In particular, a qualifier 26 is provided for qualifying and singulating parts 18. This qualifier 26 is over the downstream section 24 of the discharge means 20. If too many articles or misoriented articles 18 attempt to pass this qualifier 26, the extra articles or misoriented articles 18 will fall off the discharge means 20 back into the hopper 16.

In FIG. 3, a robotic device 28 is shown. This robotic device 28 can be any conventional robotic handling means. For example, an articulated arm for picking parts 18 off the downstream section 24 can be provided. Any suitable robotic device 28 can be used.

Due to the qualifier 26, parts 18 can be properly oriented along the downstream section 24 of the discharge means 20. This will simplify the parts recognition requirements for the robotic device 28. This will help reduce cost of the robotic device 28 and can speed up overall operation of the device. However, unlike conventional centrifugal feeders, the instant invention enables a relatively slow speed for article feed. Therefore, the robotic device 28 can have ample time in order to manipulate a part 18. Of course, any number of robotic devices 28 can be used.

Downstream from the robotic device 28 are two conveyor sections 30 and 32. Section 30 can outfeed parts 18 from conveyor section 24 to some other location. If parts are simply going to be returned to the hopper 16, then they can be diverted to the return conveyor section 32. A gate or suitable device can be provided for feeding the articles to one or both of the conveyor sections 30, 32. While two conveyor sections 30, 32 are utilized, it should be appreciated that only one of these conveyor systems could be used depending upon the system requirements. In addition, in FIG. 2, such conveyor sections 30,32 are not shown. However, such conveyor sections could also be incorporated into the conveyor design of FIG. 2. As contemplated, the downstream section 24 of the discharge means 20 in FIG. 2 will simply feed the parts 18 to another conveyor. This second conveyor can then return the parts 18 to the hopper 16 or to any other downstream location, as desired. Of course, the downstream section 24 could simply be extended to the hopper 16 such that only one conveyor would be used.

While a single qualifier 26 is shown in FIGS. 2 and 3, any number or type of qualifiers and or singulators can be used. In fact, if a sophisticated robotic device 28 is used or, if the parts were fed to some downstream location which did not require particular orientation for the articles, then the qualifier 26 could be omitted.

Figure 4:
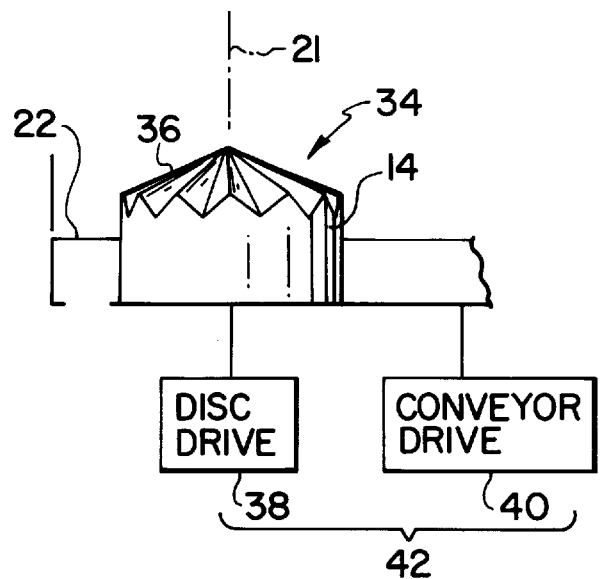
FIG. 4 is a partial sectional view taken along line IV—IV of FIG. 3.

Turning to FIG. 4, the disc 14 is shown with an upper surface 34 having a plurality of ridges 36. The alternating grooves and ridges give the disc 14 a scalloped appearance. These ridges 36 can help to pre-orient the parts 18 before they move onto the curved section 22 of the discharge means 20. For example, if cylindrical or elongated parts 18 were handled, the plurality of ridges 36 could turn the articles as they slid over the upper surface 34 of the disc towards the discharge means. These cylindrical parts would then have their longitudinal axes extending transversely across the curved section 22 of the discharge means 20. Of course, rather than using a disc with a plurality of ridges 36, the upper surface 34 of the disc could be smooth. The circumference of the disc 14 can be sixteen inches and the width of the curved section 22 and means 22 for feeding can be six inches, for example. Of course, any suitably sized disc and conveyor section can be used.

As seen in FIG. 4, the disc 14 is in engagement with the curved section 22 of the discharge means 20. A first drive means 38 can be provided for rotating the disc 14 about the vertical axis 21. A second drive means 40 can be provided for driving the curved section 22 of the discharge means 20. Since the curved section 22 and downstream section 24 of the discharge means 20 are contemplated as being a one-piece, single conveyor, for example, both these sections 22, 24 only need the second drive means 40. However, rather than using two separate drive means 38, 40, a single drive means 42 can be utilized. This drive means 42 can be connected either to the curved section 22 or downstream section 24 of the downstream section 24 of the discharge means 20. Alternatively, instead of being connected to the drive discharge means 20, this single drive means 42 could be connected to the rotatable disc 14. In either arrangement, the single drive means 42 will engage either the discharge means 20 or the rotatable disc 14.

If the rotatable disc 14 is driven by the single drive means 42, then the discharge means 20 will be driven through the frictional engagement between the driven disc 14 and the curved section 22. Likewise, if instead the discharge means 20 is directly driven by the single drive means 42, then the rotatable disc 14 can be driven through frictional engagement therewith. Of course, a chain, gear or other suitable connection other than frictional engagement can be used between -the disc 14 and discharge means 20.

Any of these arrangements will allow for synchronous movement of the rotatable disc 14 with the discharge means 20. It is contemplated that a drive could also be provided whereby slippage between the rotatable disc 14 and discharge means 20 is possible, if so desired. When using the first and second drive means 38, 40, they can be driven at the same speed in order to simultaneously rotate the disc 14 and discharge means 20, or they could be driven at different speeds depending upon the needs of the user. When the drive means 38, 40 are used, the disc and discharge means 20 can be moved independently of one another. Of course, suitable controls could be provided for synchronizing this driving movement.

As seen in FIGS. 1 and 4, the upper surface 34 of the disc 14 is a unitary unbroken surface. Therefore, the entire upper surface of the disc will move at the same speed. The upper surface 34 of the disc 14 is a conical section as shown in FIG. 4. This conical section extends to an outer periphery of the disc 14 and is next to the curved section 22 of the discharge means 20. Other disc shapes are contemplated, as will be discussed below. In FIG. 4, the outer periphery of the upper surface 34 of the disc 14 is slightly spaced above the curved section 22. The outer periphery of this disc could, however, be at the same height as the upper surface of the curved section 22. The slight drop from the upper surface 34 of the disc 14 to the curved section 22 of the discharge means 20, as shown in FIG. 4, can help to orient parts. However, it should be appreciated that this drop can be minimized to prevent unwanted tumbling of parts 18. It is generally contemplated that the outer periphery of the disc 14 will be at the same height or close to the upper surface of the curved section 22.

In FIG. 1, means 44 for vertically moving the disc 14 is shown. This means 44 can position the outer periphery of the disc 14 adjacent the upper surface of the curved section 22 or can move the disc to be raised above the curved section 22 as shown in FIG. 4. This vertical reciprocation of the disc can be used in orienting the parts. The means 44 for vertically moving can, however, be omitted in order to simplify the overall parts feeding, presentation and/or orienting apparatus 10, if so desired. While not shown in the embodiments to be discussed below, it should be appreciated that each of the disc 14 in the different embodiments of the parts feeding, presentation and/or orienting apparatus 10 of the present invention can have a means 44 for vertically moving the disc.

The means 44 for vertically moving can be especially useful when handling large parts 18. This means 44 can enable the parts to drop from the disc onto the conveyor to help in their orientation. It is contemplated that the means 44 will move the upper surface of the disc 14 to a suitable height and then the parts will be fed through the system. Then, when the apparatus 10 were to handle smaller parts, the means 44 would lower the disc 14 to be aligned with the curved section 22. On the other hand, this means 44 could continually raise and lower the disc 14 in order to orient the parts, if so desired. While the means 44 has been shown with a disc having a plurality of ridges 36, this means 44 is equally applicable for use with a disc having a smooth upper surface.

Figure 5:
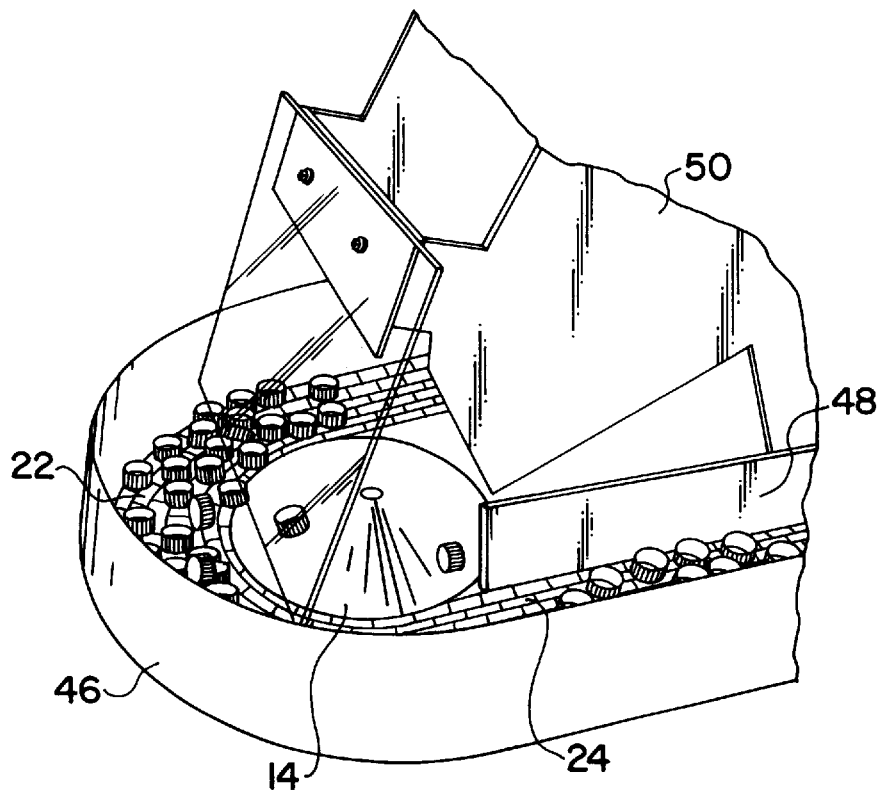
FIG. 5 is a perspective view of a rotatable disc of the parts feeding, presentation and/or orienting apparatus of a first embodiment of the rotatable disc of the present invention.

Turning to FIG. 5, disc 14 is shown with a smooth upper surface. The curved section 22 surrounds a portion of the disc similar to that of FIG. 1. A raised wall 46 encircles the curved section 22. This raised wall 46 extends along the downstream section 24 of the conveyor. However, this raised wall 46 could terminate before the downstream section 24, if so desired. An additional inner wall 48 is shown in conjunction with the raised wall 46 for the downstream section 24. When used in a recirculating environment wherein parts are wiped from the downstream section 24 of the conveyor to return to the hopper 16, the inner wall 48 and/or raised wall 46 can be omitted or terminated before reaching the qualifier 26.

A chute 50 extends from the means 12 for feeding. Parts will fall from the chute 50 onto the disc 14, and then will slide onto the curved section 22 of the discharge means 20. The parts will then move from curved section 22 to the downstream section 24. The raised wall 46 encircles at least a portion of the disc 14. This wall 46 is only at the periphery of the disc whereby the upper surface of the disc is unobstructed. Therefore, when parts falls from the chute 50, they will not be hindered by the raised wall 22. The instant invention is simplified as compared to certain prior art devices which have various guides extending over a centrifugal feeder, for example. These guides will serve to singulate the articles. Such singulation does not need to be carried out in this portion of the instant parts feeding, presentation and/or orienting apparatus 10, thereby providing for a simplified and improved design.

In FIG. 5, the outer periphery of the disc 14 is shown at the same height as the curved section 22. As previously noted, means 44 can be provided for vertically moving this disc section 14, if so desired. Therefore, the disc 14 could be above the curved section 22, if so desired.

Figure 6:
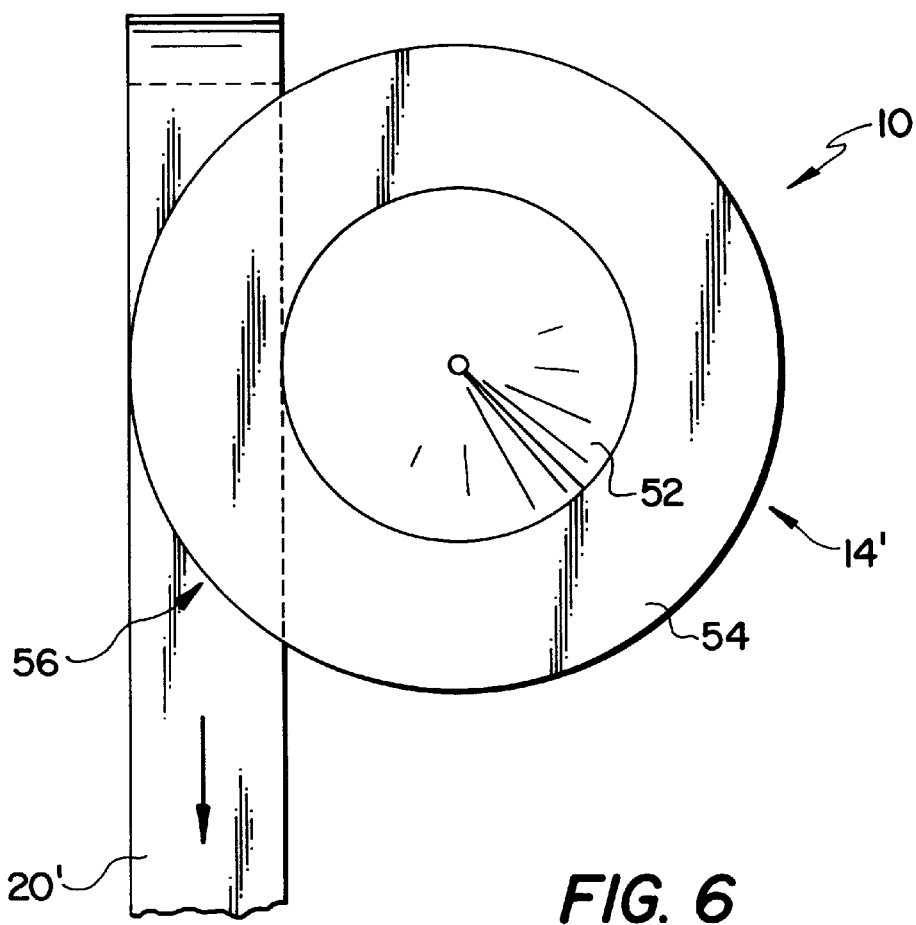
FIG. 6 is a plan view of the parts feeding, presentation and/or orienting apparatus showing a third conveyor arrangement and showing a second embodiment of the rotatable disc of the present invention.

An alternative disc embodiment 14 is shown FIG. 6. This disc 14' includes a conical section 52 and a flat section 54. The conical and flat sections 52, 54 are of a one-piece construction. These unitary sections 52, 54 move simultaneously with one another. In the previous embodiments, the conical section has an outer periphery which extends to the curved section 22 of the discharge means 20. In this embodiment of the disc 14', the flat section 54 encircles the conical section 52. A straight, non-curved discharge means 20' is used in the embodiments of FIGS. 6 and 7. In the previous embodiment, a pleated or expandable conveyer is used to accommodate a change in shape of the conveyer from the curved section 22 to the downstream section 24. This conveyor can have openings or cracks which could catch ears or tiny parts of the articles 18. In the FIGS. 6 and 7 embodiments, a smooth, unbroken conveyer can be used as a discharge means 20'. There are no openings in this conveyer for catching ears or other tiny parts of the articles 18 to be handled. The conveyer of the discharge means 20' is contemplated as being a straight, linear conveyer.

This conveyer 20' can feed to a downstream qualifier 26 which can return parts to the hopper 16. One or more of robotic devices 28 can be used as well as downstream outfeed conveyer sections 30 and/or return conveyer section 32. While a unbroken, endless continuous conveyer belt is shown as a second discharge means 20', it should be contemplated that any suitable conveyer means can be used. For example, a vibratory conveyer, a roller conveyer or other suitable conveyer means can be used.

Figure 7:
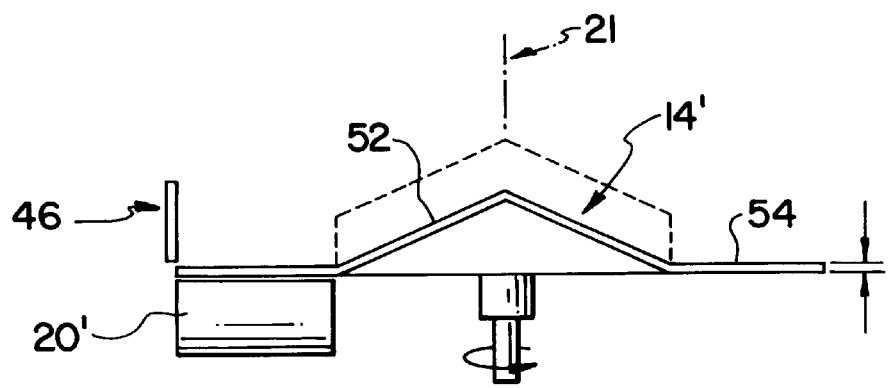
FIG. 7 is a sectional side view of FIG. 6.

The means 12 for feeding will take articles from a hopper 16 and dump them onto the conical section 52 of the disc 14' in the embodiment of FIGS. 6 and 7. The articles will slide from the conical section 52 onto the flat section 54 of the disc 14'. A raised wall can be provided around at least a portion of the periphery of the flat section 54 in order to prevent parts from falling from the disc 14'. At an outlet area 56, the parts 18 are moved from the flat section 54 of the disc 14' onto the discharge means 20'. The raised wall 46 is omitted along this portion of the periphery of the flat section 44.

As seen in FIG. 7, the distance between the flat section 54 and the discharge means 20' is very small. Therefore, parts will not tumble when they move from the rotating disc 14' onto the discharge means 20'. This aids in maintaining a proper orientation of the parts. While a smoother upper surface is shown for the conical section 52, in FIG. 7, a plurality of ridges 36 could be provided in this conical section for pre-orientation of the parts.

The dotted line showing of the conical section 52 in FIG. 7 is to indicate that this section can be vertically reciprocated by means 44. Since it is contemplated that the conical section 52 and flat section 54 are a one-piece structure, vertical movement of the conical section 54 will inherently move the flat section 54. It is possible, however, in order to separate these two sections such that only the conical section 52 reciprocates while the flat section 54 remains relatively close to the upper surface of the discharge means 20'. The embodiment of disc 14' shown, however, is of a continuous, unbroken one-piece disc.

The flat section 54 of the disc 14' is rotatable in a generally horizontal plane which is generally perpendicular to the vertical axis about which the disc 14' rotates. The flat section 54 and conical section 52 are contemplated as being fixed together and are non-movable relative to one another as noted above. A circumference of the outer edge of the flat section 54 is greater than the circumference of the outer edge of the conical section 52, as is apparent from FIGS. 6 and 7. The upper surface of the flat section 54 is a lowest point at which parts will rest on disc 14. Therefore, there is no need to lift articles from the disc 14' onto the discharge means 20'. Rather, articles can simply slide from the flat section 54 onto the discharge means 20'. This avoids the need for lifting the articles thereby simplifying the apparatus and helping to prevent misorientation of the parts.

The present invention provides for a method of feeding, presenting and/or orienting parts. The parts are fed to a rotatable disc 14, 14' by means 12 for feeding. The parts move from the hopper 16 to the rotatable disc 14 or 14' and then to discharge means 20 or 20'. The disc 14, 14' is rotated in order to spread out the parts. The parts are then discharged to a curved section 22 of the discharge means 20 in the first embodiment of the present invention. The parts are then conveyed away from the curved section 22 and the disc 14 to a downstream conveyer section 24.

While the curved section 22 of the discharge means and the disc 14, 14' are helpful in spreading out the parts 18 as noted above, it is important to recognize that certain aspects of the invention are not limited to the use of such a disc and curved section 22. Rather, it is possible for the means 12 for feeding to feed parts 18 directly to the discharge means 20. This discharge means 20 could be a straight conveyor, curved conveyor, conveyor with straight and curved sections or other suitable conveying device. In this aspect of the invention, the parts would be conveyed downstream whereat they could be manipulated by a robotic device 28, for example. It is contemplated that in this aspect of the invention, the parts could be singulated and oriented on the discharge means 20 by one or more qualifiers 26, for example. These misoriented, unwanted or multiple parts would be returned to the hopper 16 by either falling thereinto or by sliding back to the hopper along a chute. Nonetheless, in this aspect of the invention, recirculation of parts 18 is carried out.

The present invention enables easy and efficient feeding, presentation and/or orienting of parts. The overall footprint of the present apparatus 10 is relatively small as compared with certain prior art devices. For example, when a centrifugal feeder has conventionally been used, the depth of the bowl has been increased when handling large parts. This can increase the overall footprint or space required by the centrifugal feeder. Due to the depth of the hopper 16 of the present invention, the overall footprint of the apparatus 10 of the present invention need not necessarily be increased when handling larger sized parts.

Moreover, the instant invention is less complicated and expensive than conventional centrifugal feeders. This apparatus 10 of the present invention can operate at different speeds. In fact, it is possible to feed parts at a relatively slow speed in order to accommodate the downstream robotic device 28. Recirculation of the parts in a relatively simple manner is obtained which has, heretofore, been unavailable in the prior art. Vertical movement of the disc 14 or 14' is possible with the instant invention, and provision of ridges 36 can be done for the disc 14 or 14'. Therefore, pre-orientation of parts 18 is, therefore, possible. The relatively large surface area of the disc 14 or 14' compared to a cross section of the discharge means 20 or 20' enables parts to be spread out without clogging during their feeding period. Therefore, jamming of the apparatus 10 can be avoided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for at least one of feeding, presenting and orienting parts comprising:

a rotatable disc;

means for feeding parts to the disc; and a conveyor having a curved section and a downstream section, the curved section being upstream of the downstream section, the curved section of the conveyor surrounding at least a part of the disc, the curved section being adjacent the disc for receiving parts from the disc and being level at least adjacent the disc, the downstream section conveying parts away from the disc.

2. The apparatus as recited in claim 1, wherein the downstream section of the conveyor has a generally linear path.

3. The apparatus as recited in claim 1, wherein the conveyor is continuous and unbroken between the curved section and the downstream section.

4. The apparatus as recited in claim 1, wherein the disc has a conical section on an upper surface thereof, the means for feeding dumps parts onto the conical section of the disc.

5. The apparatus as recited in claim 4, wherein a plurality of ridges are provided in the upper surface of the disc for at least partially orienting parts.

6. The apparatus as recited in claim 4, wherein the upper surface of the disc is spaced above the adjacent curved section of the conveyor whereby parts drop from the upper surface of the disc onto the curved section.

7. The apparatus as recited in claim 6, further comprising means for vertically moving the disc relative to the curved section of the conveyor.

8. The apparatus as recited in claim 1, further comprising means for vertically moving the disc relative to the curved section of the conveyor.

9. The apparatus as recited in claim 1, further comprising a hopper and a qualifier, the means for feeding feeds parts from the hopper to an upper surface of the disc, the downstream section of the conveyor extends past the hopper and the qualifier returns misoriented parts from the downstream section of the conveyor to the hopper.

10. The apparatus as recited in claim 9, wherein the hopper is below the downstream section of the conveyor and wherein the qualifier wipes misoriented parts from the downstream conveyor which thereafter fall back into the hopper.

11. The apparatus as recited in claim 10, further comprising a robotic device downstream from the qualifier for receiving parts from the downstream section of the conveyor.

12. The apparatus as recited in claim 11, wherein the downstream section of the conveyor returns parts which pass the robotic device to the hopper whereby the apparatus recirculates parts.

13. The apparatus as recited in claim 1, further comprising first means for driving the disc and second means for driving the curved section of the conveyor whereby the disc and curved section of the conveyor are independently movable relative to one another.

14. The apparatus as recited in claim 1, further comprising means for driving both the disc and the curved section of the conveyor whereby the disc and curved section of the conveyor are simultaneously driven.

15. The apparatus as recited in claim 14, wherein the means for driving is connected to the curved section of the conveyor and the disc is driven by frictional contact with the curved section of the conveyor.

16. A method for at least one of feeding, presenting and orienting parts comprising the steps of:

feeding parts to a disc;

rotating the disc to spread out the parts fed thereto;

discharging the parts to a curved section surrounding at least a portion of the disc;

moving the parts in a plane while the parts are on the curved section; and conveying the parts away from the curved section and the disc with a downstream conveyor section.

17. The method for at least one of feeding, presenting and orienting as recited in claim 16, wherein the step of conveying comprising moving the parts along a linear path away from the disc.

18. The method for at least one of feeding, presenting and orienting as recited in claim 16, further comprising the step of using a single conveyor as the curved conveyor section and the downstream conveyor section to thereby avoid transferring parts between sequential conveyor at a junction between the curved conveyor section and the downstream conveyor section.

19. The method for at least one of feeding, presenting and orienting as recited in claim 16, wherein the step of feeding parts to the disc comprises discharging parts to an upper surface of the disc, the upper surface of the disc having a conical section.

20. The method for at least one of feeding, presenting and orienting as recited in claim 19, wherein the upper surface of the disc has a plurality of ridges provided therein and wherein the method further comprises the step of orienting parts with the ridges in the disc.

21. The method for at least one of feeding, presenting and orienting as recited in claim 19, wherein the upper surface of the disc is spaced above the adjacent curved section of the conveyor and wherein the method further comprises the step of dropping parts from the upper surface of the disc onto the curved section of the conveyor.

22. The method for at least one of feeding, presenting and orienting as recited in claim 16, further comprising the step of vertically moving the disc relative to the curved conveyor section.

23. The method for at least one of feeding, presenting and orienting as recited in claim 16, further comprising the steps of:

removing parts from a hopper during the step of feeding parts;

passing parts fed from the hopper to the downstream conveyor section over the hopper;

qualifying parts on the downstream conveyor section such that misoriented parts are removed from the downstream conveyor section and fall back into the hopper.

24. The method for at least one of feeding, presenting and orienting as recited in claim 23, further comprising the step of removing parts from the downstream conveyor section with a robotic device after the step of qualifying.

25. The method for at least one of feeding, presenting and orienting as recited in claim 24, further comprising the step of returning parts remaining on the downstream conveyor section after the step of removing, parts being returned to the hopper during the step of returning.

26. An apparatus for at least one of feeding, presenting and orienting parts comprising:

a rotatable disc having a conical section on an upper surface thereof, the disc being rotatable about a vertical axis, the upper surface of the disc forming a unitary surface which is rotatable at a same speed;

means for feeding parts to the disc;

a wall encircling at least a portion of the disc, the wall being only at a periphery of the disc whereby the upper surface of the disc is unobstructed; and discharge means for receiving parts from the disc, the discharge means being close to the disc such that parts move from the disc to the discharge means without tumbling, the discharge means being positioned to receive parts from a major portion of a circumference of the disc.

27. The apparatus as recited in claim 26, wherein the unitary surface of the upper surface of the disc is unbroken and continuous.

28. The apparatus as recited in claim 26, wherein the disc includes a flat section as well as the conical section, the flat section being rotatable in a generally horizontal plane which is generally perpendicular to the vertical axis about which the disc rotates.

29. The apparatus as recited in claim 28, wherein the flat section and the conical section are fixed together and non-movable relative to one another.

30. The apparatus as recited in claim 28, wherein the flat section and the conical section each have an outer edge and wherein a circumference of the outer edge of the flat section is greater than a circumference of the outer edge of the conical section.

31. The apparatus as recited in claim 28, wherein the flat section encircles the conical section.

32. The apparatus as recited in claim 28, wherein the flat section of the disc supports parts prior to parts moving to the discharge means, the upper surface of the flat section being a lowest surface of the disc for supporting parts thereon whereby parts are movable from the conical section to the flat section and then to the discharge means without being lifted.

33. The apparatus as recited in claim 32, wherein the flat section of the disc is rotatable above the discharge means.

34. The apparatus as recited in claim 28, wherein the flat section of the disc is rotatable above the discharge means.

35. The apparatus as recited in claim 26, wherein the disc is rotatable above the discharge means.

36. The apparatus as recited in claim 26, further comprising means for vertically moving the disc relative to the discharge means such that the disc is movable from a position close to the discharge means to a position vertically spaced from the discharge means.

37. The apparatus as recited in claim 36, wherein the conical section of the disc has a plurality of ridges for at least partially orienting parts.

38. The apparatus as recited in claim 26, wherein the conical section of the disc has a plurality of ridges for at least partially orienting parts.

39. The apparatus as recited in claim 26, wherein the conical section extends to an outer periphery of the disc.

40. The apparatus as recited in claim 26, wherein the discharge means is a conveyor.

41. The apparatus as recited in claim 26, further comprising a hopper and a qualifier, the means for feeding feeds parts from the hopper to the conical section of the disc, the discharge means having a downstream section which extends past the hopper and the qualifier returns misoriented parts from the downstream section of the discharge means to the hopper.

42. The apparatus as recited in claim 41, wherein the hopper is below the downstream section of the discharge means and wherein the qualifier wipes misoriented parts from the downstream section of the discharge means which thereafter fall back into the hopper.

43. The apparatus as recited in claim 42, further comprising a robotic device downstream from the qualifier for receiving parts from the downstream section of the discharge means.

44. The apparatus as recited in claim 43, wherein the downstream section of the discharge means returns parts which pass the robotic device to the hopper whereby the apparatus recirculates parts.

45. An apparatus for at least one of feeding, presenting and orienting parts comprising:

a hopper for storing parts;

means for feeding parts from the hopper;

a conveyor having a first and second section, the first section of the conveyor receiving parts from the means for feeding, the first section of the conveyor being spaced from the hopper and the second section of the conveyor extending over the hopper while the first section fails to be over the hopper; and a qualifier for wiping misoriented parts from the second section of the conveyor, the qualifier being located at the second section of the conveyor which extends over the hopper such that misoriented parts fall from the hopper back to the conveyor.

46. The apparatus as recited in claim 45, wherein the conveyor terminates at a position adjacent the hopper whereby parts are recirculatable to the hopper.

47. The apparatus as recited in claim 46, further comprising a robotic device downstream from the qualifier for receiving at least some parts from the conveyor, parts which pass the robotic device being returned to the hopper by the conveyor.

48. The apparatus as recited in claim 45, further comprising a rotatable disc having a conical section on an upper surface thereof, the means for feeding feeds parts to the conical section of the disc.

49. The apparatus as recited in claim 48, wherein the first section of the conveyor includes a curved section, the curved section of the conveyor being connected to the second section of the conveyor which is downstream from the first section, the curved section of the conveyor surrounding at least a part of the disc.

50. The apparatus as recited in claim 48, wherein the disc is rotatable over the conveyor whereby parts drop from the upper surface of the disc onto the conveyor.

51. The apparatus as recited in claim 48, further comprising means for vertically moving the disc relative to the conveyor.

52. The apparatus as recited in claim 48, wherein a plurality of ridges are provided in the conical section for at least partially orienting parts.

53. The apparatus as recited in claim 48, wherein the disc is rotatable about a generally vertical axis.

54. The apparatus as recited in claim 48, wherein the conical section extends to an outer periphery of the disc.

55. The apparatus as recited in claim 48, wherein the disc has a flat section as well as the conical section, the flat section being rotatable with the conical section.

56. The apparatus as recited in claim 55, wherein the disc is rotatable about a vertical axis and wherein the flat section of the disc is rotatable in a generally horizontal plane which is generally perpendicular to the vertical axis about which the disc rotates.

57. The apparatus as recited in claim 55, further comprising a wall encircling at least a portion of the disc, the wall being only at a periphery of the disc whereby the upper surface of the disc is unobstructed.

58. The apparatus as recited in claim 55, wherein the flat section encircles the conical section.

59. The apparatus as recited in claim 55, wherein the flat section is rotatable above the conveyor.

60. The apparatus as recited in claim 55, wherein the means for feeding includes a rotatable disc and wherein the apparatus further comprises means for vertically moving the disc relative to the conveyor.

* * * * *